Oct. 21, 1958  G. E. HOOK ET AL  2,857,006
AIR DRIVEN PROPELLER AND GOVERNOR THEREFOR
Filed April 1, 1954  2 Sheets-Sheet 1

INVENTORS
Gerald E. Hook
BY John H. Smith

Craig V. Morton
Their Attorney

Oct. 21, 1958        G. E. HOOK ET AL        2,857,006
AIR DRIVEN PROPELLER AND GOVERNOR THEREFOR
Filed April 1, 1954        2 Sheets-Sheet 2

INVENTORS
Gerald E. Hook
BY John H. Smith

Craig V. Morton
Their Attorney

United States Patent Office 2,857,006
Patented Oct. 21, 1958

2,857,006

AIR DRIVEN PROPELLER AND GOVERNOR THEREFOR

Gerald E. Hook, Tipp City, and John H. Smith, Dayton, Ohio, assignors to General Motors Corporation, Detroit, Mich., a corporation of Delaware Application April 1, 1954, Serial No. 420,277

9 Claims. (Cl. 170—68)

This invention pertains to air driven propellers, and particularly to a variable pitch air driven propeller including governing means for maintaining propeller speed within predetermined limits.

Heretofore, air driven propellers have included governing means having centrifugally responsive flyweights which comprise weighted arms. Movement of the flyweights by centrifugal force is usually opposed by a compression spring, such that when the opposing forces are in equilibrium, no pitch changing movement will be imparted to the propeller blades. However, it has been observed that the unequal mass distribution of the weights with respect to the blade axes causes undesirable bending moments to be imposed on the root of the blades. Accordingly, among our objects are the provision of a governor for a variable pitch propeller including flyweights having substantially equal masses disposed on opposite sides of their rotative axes; the further provision of an air driven propeller including a positive low pitch stop and a positive high pitch stop; and the still further provision of an air driven variable pitch propeller including mechanical governing means for maintaining propeller speed within a preselected range.

The aforementioned and other objects are accomplished in the present invention by incorporating a mechanical governor having a linear "droop" characteristic which maintains propeller speed within a preselected range. This type of governor differs from an isochronous governor, which maintains propeller speed substantially constant at all pitch positions of the propeller, in that with the "droop" type governor, the speed setting, or datum level, thereof varies in a substantially linear relationship with blade angle. The governing mechanism of this invention constitutes an improvement over that disclosed in copending application, Serial No. 420,278, filed of even date herewith, in the name of Alan B. Blackburn, et al.

The air driven propeller of this invention includes a hub within which a pair of blades are journaled for rotation about their longitudinal axes. The hub is connected to and supported by a rotatable shaft, which is drivingly connected with an emergency aircraft accessory, such as a pump or generator. The mechanical governor includes a pair of centrifugally responsive flyweights, which are journaled for rotation about the blade axes, and have substantially equal masses disposed on each side of the blade axes. In this manner, the net bending moment imposed upon the blades by the flyweights is reduced to zero. Each flyweight is operatively connected to a blade so that movement of the flyweight in response to centrifugal force will rotate the blades about their axes. Each blade has attached to its root section a retainer, which comprises a substantially cup-shaped member having an annular groove with a segment of one groove wall relieved so as to form a pair of spaced shoulders. A torsion spring is situated in the groove of each retainer member, one end of the spring being attached to a flyweight and the other end of the spring being attached to the retaining member. The torsion springs perform two functions, namely, to rotate the blades to a high pitch, or incidence angle, when the propeller is stationary, and to control the rate of "unfeathering" after the propeller unit is positioned in a moving air stream.

Each flyweight carries a pair of upstanding pins, one pin being arranged to engage the propeller shaft so as to form a mechanical low pitch stop for the propeller blades. The other pin on each flyweight is operatively connected to a connecting rod or link, which links function to both synchronize movement of the blades and to transmit a spring force to the flyweights which opposes movement thereof in response to centrifugal force. The links are pivotally connected at their other ends to a reciprocable collar, which is slidably supported on the propeller shaft. The collar is biased by a governor spring so as to oppose outward movement of the flyweights, the arrangement of the governor being such that at any of the preselected speeds of propeller rotation within the governing range and at the corresponding blade angle position, the opposing forces acting on the blades will be in equilibrium, thereby maintaining the blade angle substantially constant.

Further objects and advantages of the present invention will be apparent from the following description, reference being had to the accompanying drawings wherein a preferred embodiment of the present invention is clearly shown, and wherein similar reference characters denote similar parts throughout the several views.

Figure 3:
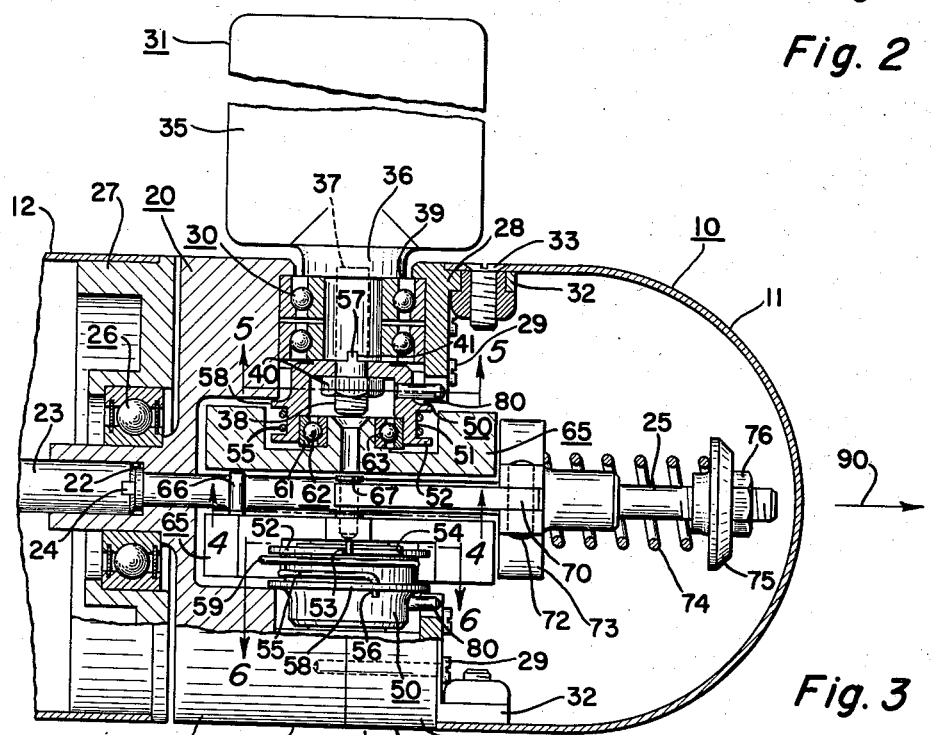
Fig. 3 is an enlarged view, partly in section and partly in elevation, taken generally along the line 3—3 of Fig. 2, with certain parts broken away.
Figure 4:
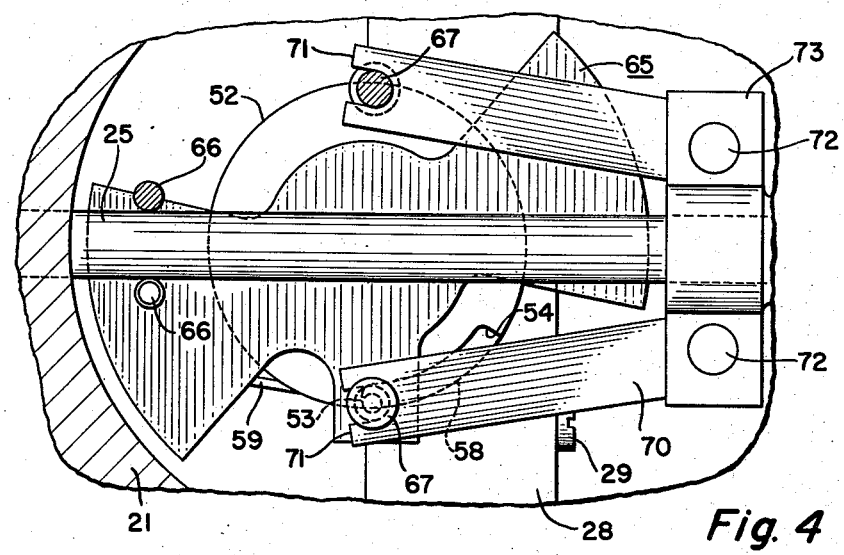
Figure 6:
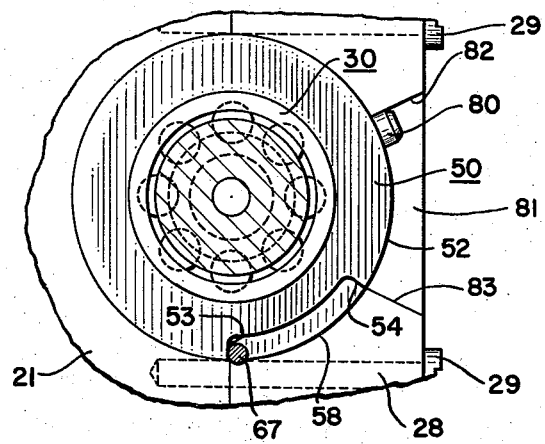
Figure 5:
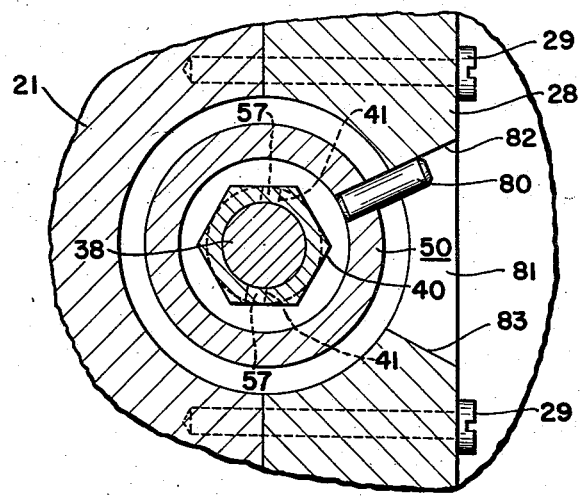

Figs. 4, 5 and 6 are enlarged fragmentary views, taken along lines 4—4, 5—5 and 6—6, respectively, of Fig. 3.

Figure 1:
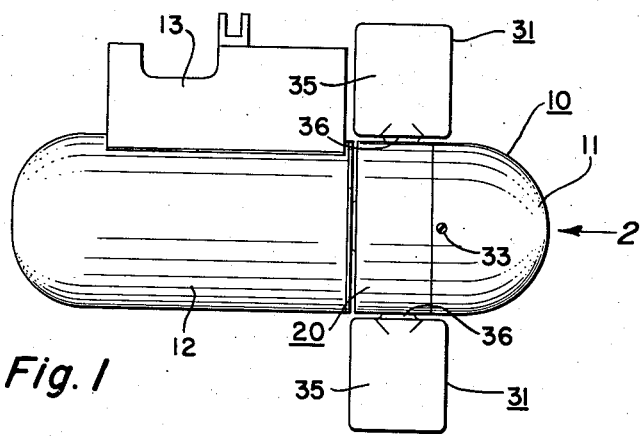
Fig. 1 is a side view, in elevation, of an air driven propeller unit.
Figure 2:
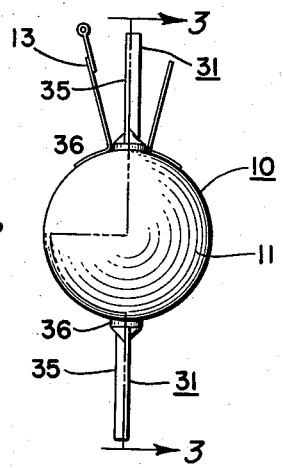
Fig. 2 is a front view, in elevation, taken in the direction or arrow 2 in Fig. 1.

With particular reference to Figs. 1 through 3 of the drawings, an air driven propeller assembly 10 is depicted comprising a spinner 11, which is attached to and rotatable with the propeller. The assembly also includes a casing 12 having attached thereto a bracket 13 by which means the propeller assembly 10 may be supported in an aircraft, either within the aircraft fuselage or in the air stream thereof. In the present embodiment, the accessory driven by the propeller and disposed within the casing 12 comprises a four-pole, 400 cycle alternator, the speed of which must be maintained between 11,400 R. P. M. and 12,600 R. P. M. so as to maintain the frequency of alternating current within 20 cycles of the design frequency, namely 400 cycles.

With particular reference to Fig. 3, the propeller structure comprises a hub assembly 20, which includes a member 21 that has a surface in alignment with the horizontal blade axes. The member 21 is formed with a centrally disposed stepped bore 22 within which a driven shaft 23 is connected by means of a tongue and groove connection 24 with a shaft extension 25 that is connected with the member 21 by means of a press fit. The member 21 is rotatably supported by a roller bearing means 26, which is carried by a flanged member 27 attached to the stationary casing 12. The hub assembly 20 also includes a pair of semi-cylindrical members 28, which are connected to semi-cylindrical portions of the member 21 by means of bolts 29. The complementary semi-cylindrical portions of the members 21 and 28 are formed with internal grooves which support the outer races of a ball bearing assembly 30.

The complementary semi-cylindrical openings in the members 21 and 28 form sockets for the reception of propeller blades 31. The member 28 includes two bracket portions 32 to which the spinner 11 is attached by screw devices 33. In this design the spinner 11 is piloted on and retained by screws 33 to bracket portions 32 on the member 28 which is of annular shape with two opposed semi-cylindrical cutouts at the rear face thereof. These cutouts surround the hub portions 36 of the blades in cooperation with similar aligned cutouts on the member 21, as shown in Fig. 3.

As shown in Fig. 3, each blade comprises an airfoil section 35 and a root section 36. The root section 36 of each blade is formed with a centrally disposed recess 37 within which a threaded stud 38 is retained by any suitable means, such as a cross pin, not shown. A threaded portion of each stud 38 is engaged by a nut 40, as shown in Fig. 3. The inner races of ball bearing means 30 are supported between a shoulder 39 on the blade root 36 and a retaining member 50, which is interposed between the nut 40 and the blade root 36, as shown in Fig. 3.

Each retaining member 50, which comprises a generally cup-shaped member, has an opening in its bottom wall through which the stud 38 extends. In addition, the bottom wall of each retainer member 50 is formed with a pair of diametrically, opposed tangs, only one, 57, of which is shown in Fig. 3, which tangs are received in a diametrical slot 41 formed in the blade root. In this manner, when the nut 40 is tightened upon the stud 38, the blades 31 are rigidly connected to the retaining members 50. Each retaining member 50 is also formed with an annular groove 51, one wall 52 of which is relieved to form a pair of spaced shoulders 53 and 54, as shown in Fig. 6. A torsion spring 55 is disposed within the groove 51 of each retaining member 50, one end 56 of each spring 55 being attached to its respective retaining member 50 by projecting through an opening in a flange 58 constituting the other wall of the annular groove 51, as shown in Fig. 3.

Each retaining member 50 supports the outer race 61 of a ball bearing assembly 62, the inner race 63 of which is attached to a flyweight 65. Thus, the roller bearing means 62 supports the flyweights 65 for rotation about the axes of blades 31 and also prevents relative axial movement therebetween. As is seen particularly in Fig. 4, each flyweight 65 includes diametrically opposed weighted portions of substantially equal mass, which impose substantially no twisting moment on the retaining members 50, and, therefore, the blades 31. The other end 59 of each torsion spring, situated in the groove 51 of the retaining members 50, is suitably connected with a flyweight 65. Each flyweight carries a pair of upstanding pins 66 and 67. The pins 66 are arranged to abut opposite sides of shaft extension 25, as shown in Fig. 4 and thereby constitute a low pitch stop for the propeller blades 31 at an angle of positive 25°.

The pins 67 are engaged by a pair of connecting rods, or links, 70. As seen particularly in Fig. 4, the links are formed with bifurcated ends 71, within which the pins are situated. The other ends of the links 70 are pivotally connected at 72 to a collar 73 slidably supported on the shaft extension 25. The links 70 perform a dual function, namely to synchronize movement of the blades 31 about their longitudinal axes, and to transmit a governor spring force to the flyweights 65 in opposition to the thrust of centrifugal force acting thereon. Thus, as shown in Fig. 3, the collar 73 is engaged by one end of a preloaded compression spring 74, the other end of which engages a spring seat 75, which is carried by the shaft extension 25 and restrained against movement relative thereto by means of a nut 76, which threadedly engages the end portion of shaft 25.

The pins 67, carried by the flyweights 65, are also received in the relieved portion of flange 52, which arrangement provides a lost motion connection between the retainers 50 and the flyweights 65. As shown in Figure 3, 4 and 6, the pins 67 are in engagement with shoulder 53 of the flange 52, while the pins 66 are in engagement with shaft 25. These conditions exist whenever the propeller is stationary, i. e. is not positioned in a moving air stream, at which time, the torsion springs 55 are operable to rotate the blades 31 to the high pitch stop position of approximately a positive 75°. The purpose of this arrangement will be described more particularly hereinafter.

As seen in Figs. 5 and 6, each retaining member 50 also carries a radially extending pin 80, which rotates with the retaining member 50 and, hence, is indicative of the pitch position of its respective blade 31. In addition, each member 28 is formed with a tapered opening 81 therein, which opening presents surfaces 82 and 83. When the pin 80 is moved into engagement with surface 82, the blades are at the high pitch position of 75°, and, thus, the pin 80 and the surface 82 constitute a positive stop, which determines the highest pitch position of the blades to which they can be moved by either the torsion springs 55 when the propeller is stationary, or by the flyweights 65 when the propeller is rotating.

The operation of the governing mechanism and the mechanical pitch changing mechanism will now be described. As set forth in the aforementioned copending application, Serial No. 420,279, the propeller blades are subjected to external twisting moments which tend to rotate the blades about their longitudinal axes. In the present instance, the blades 31 are subjected to an aerodynamic twisting moment approximately proportional to air speed and varying with altitude, which tend to rotate the blades to a high pitch position. The blades 31 are also subjected to centrifugal twisting moments proportional to propeller R. P. M. and varying with blade angle, which tend to move the blades to a low pitch angle. The force of governor spring 74 acting through collar 73 and the links 70 also tends to move the blades to a low angle position by opposing outward movement of the flyweights 65 under the urge of centrifugal force, which flyweights tend to move the blades 31 to a high pitch position. The governor spring force and the mass of the flyweight 65 are chosen so that within a preselected range of rotational speed, for instance, 11,400 R. P. M. to 12,600 R. P. M., the opposing forces acting to alter the pitch, or incidence angle, of the blades at blade angles between 25° and 75° will be in equilibrium. Moreover, the governing mechanism of this invention will function to maintain propeller speed within this preselected range irrespective of variation in either air stream speed between 150 and 600 knots or in load on the accessory, by altering the angle of incidence of the blades 31.

The position of the flyweights 65, the links 70, and the blades 31, when the propeller is stationary, is depicted in Figs. 1 through 3. Thus, the propeller blades are at the high pitch stop position of approximately 75°, which conditions prevail when the propeller unit is not exposed to a moving air stream. Thus, the torsion spring 55 will wind up and move the blades 31 to the high angle position wherein pin 80 abuts surface 82, as seen in Figures 5 and 6, thereby positioning pin 67 in engagement with shoulders 53 of the retaining members 50. This angle is chosen so that when the propeller unit is released into a moving air stream, maximum torque is obtained for rapid starting, and the blades are protected against violent flat plate shock forces. The springs 55 are operable to effect this movement of the blades 31, inasmuch as the pins 66, carried by the flyweights, are moved into engagement with shaft extension 25 during the winding up of the spring 55 when the propeller is stationary. When the propeller is released into a moving air stream, the moving air impinging on the blades will effect propeller rotation, and the centrifugal twisting moments acting on the blades will move the blades to the low pitch stop position. During this movement, the retaining members 50 are rotated in a clockwise direction, as viewed in Figs. 4 through 6, thereby positioning the pins 67 in engagement with shoulders 54 of the annular flanges 52. When the propeller attains a sufficient rotation speed, the direction of flight being indicated by arrow 90 in Fig. 3, the blades 31 will be in a position where the pins 67 and the shoulders 54 are maintained in engagement, and the forces of the spring 74 and a centrifugal twisting moment are in equilibrium with the centrifugal force imposed upon the flyweights and the aerodynamic twisting moment. While the springs 55 do not exert any appreciable force opposing movement of the blades toward the low pitch stop position, they do control the rate of "unfeathering," or movement from the high pitch stop position to the low pitch stop position.

As stated hereinbefore, the mechanical governor of this invention is not of the isochronous type, in that the governor has a linear "droop" characteristic, which renders the governor sensitive to blade angle. That is, the governor is designed to establish an equilibrium of the opposing forces at a 50° blade angle during propeller rotation at 12,000 R. P. M. However, as the blade angle decreases from 50° to 25°, the speed setting of the governor decreases lineally so that at 25°, the opposing forces will be in equilibrium at 11,400 R. P. M. Conversely, as the pitch position increases from 50° to the high angle position of 75°, the governor speed setting, or datum level will vary lineally between 12,000 R. P. M. and 12,600 R. P. M. This relationship exists due to the fact that the flyweight governing force is substantially proportional to propeller rotational speed and blade angle.

Thus, when the propeller unit is positioned in a moving air stream, the blades 31 will move towards the low pitch stop position as propeller speed increases. In this manner, the blades will provide maximum torque to effect rapid acceleration of the propeller unit. When the propeller attains a speed within the preselected range, i. e., between 11,400 R. P. M. and 12,600 R. P. M., the opposing forces acting on the blades will be in equilibrium at some particular blade angle between a positive 25° and a positive 75°. Moreover, as long as the opposing forces are in equilibrium, this particular blade, or incidence angle, will be maintained substantially constant.

However, if under these conditions, the propeller should overspeed, due to a decrease in the load on the accessory or an increase in air speed, the flyweight 65 will rotate in a counterclockwise direction, as viewed in Fig. 4, so as to overcome the governor spring force and the centrifugal blade twisting moments, and thereby rotate the blades to a higher pitch angle. Movement of the blades to a higher pitch angle due to counterclockwise rotation of the flyweights 65, as viewed in Fig. 4, is effected by reason of the fact that the pins 67 are in engagement with shoulders 54 of the flanges 52 so that counterclockwise movement of the flyweight 65 will impart counterclockwise movement to the retaining members 50, which are operatively connected to the blades 31. At this higher pitch angle, a new speed setting, or datum level, for the governor will be automatically established. Thus, the governor will function to maintain a higher rotational speed of the propeller, as called for by the higher pitch angle, at which the opposing forces acting on the blades will be in equilibrium.

Conversely, if the propeller should underspeed with the blades at some particular blade angle, due to an increase in the load on the driven accessory or a decrease in the air speed, the governor spring force and centrifugal twisting moments will be greater than the flyweight centrifugal force, and thereby rotate the blades to a lower pitch angle. Movement is imparted to the blades inasmuch as due to a lower rotational speed, the flyweights 65 rotate tending to move pin 67 out of engagement with shoulders 54, thereby permitting the centrifugal twisting moments to reduce the pitch angle. Here again, the datum level, or speed setting, of the mechanical governor is changed and the governor will now establish equilibrium forces at a lower speed within the preselected speed range which corresponds to the particular angle of the blades. In this manner when the opposing forces acting on the blades are again in equilibrium, the adjusted pitch angle of the blades will remain substantially constant.

While the embodiment of the present invention as herein disclosed, constitutes a preferred form, it is to be understood that other forms might be adopted.

What is claimed is as follows:

1. An air driven propeller comprising, a hub, a plurality of blades journaled in said hub for pitch adjustment, a rotatable shaft connected with said hub so as to be driven thereby, a centrifugally responsive flyweight supported for rotation about the longitudinal axis of each blade and having substantially equal masses disposed on opposite sides of said blade axis, means interconnecting the blades and said centrifugally responsive flyweights for effecting movement of said blades towards a high pitch position upon rotation of said propeller, said last recited means including a member attached to each propeller blade having a pin and slot connection with its respective flyweight, and resilient means operatively connected with said flyweights for opposing movement thereof under the urge of centrifugal force during propeller rotation.

2. An air driven propeller including, a hub, a plurality of blades rotatably supported in said hub and operable to rotate said sub when positioned in an air stream, centrifugally responsive means having operative pin and slot connection with said blades and rotatable with said hub for increasing the angle of incidence of the blades, said centrifugally responsive means comprising a plurality of flyweights having equal masses disposed on opposite sides of the blade axes, and resilient means operatively connected with said flyweights for opposing movement thereof due to centrifugal force, the construction and arrangement being such that at a predetermined rotative speed of the propeller for each angle of incidence of said blades, the opposing forces tending to alter the incidence angle of said blades will be in equilibrium.

3. An air driven propeller including in combination, a hub, a plurality of blades journaled in said hub for pitch adjustment and operable to impart rotation to said hub when positioned in an air stream, a cup-shaped member atached to each blade having a pair of spaced abutments thereon, a centrifugally responsive flyweight supported for rotation by each cup-shaped member, a lost motion connection between each flyweight and its respective cup-shaped member comprising a pin on each flyweight engageable with either of said spaced abutments on its respective cup-shaped member, and resilient means operatively connected with said flyweights for opposing movement thereof due to centrifugal force.

4. An air driven propeller including an combination, a hub, a pair of blades journaled in said hub for pitch adjustment and operable to impart rotation to said hub when positioned in an air stream, a member attached to each blade having a pair of spaced abutments thereon, a centrifugally responsive flyweight rotatably supported by each member, said flyweights having substantially equal masses disposed on opposite sides of the blade axes, a lost motion connection between each flyweight and its respective supporting member comprising a pin on each flyweight engageable with either of said spaced abutments on its respective supporting member, and resilient means operatively connected with said flyweights for opposing movement thereof in response to centrifugal force.

5. An air driven propeller including in combination, a hub, a pair of blades journaled in said hub for rotation about their longitudinal axes, said blades being operable to impart rotation to said hub when positioned in an air stream, a cup-shaped member attached to each blade, cooperable means on said cup-shaped members and said hub for establishing a high pitch stop for said blades, a centrifugally responsive flyweight supported for rotation by each cup-shaped member and having substantially equal masses disposed on opposite sides of the longitudinal blade axes, said flyweights being operatively connected with said cup-shaped member for increasing the pitch position of said blades in response to centrifugal force, and resilient means operatively connected with said flyweights for opposing movement thereof in response to centrifugal force.

6. An air driven propeller including in combination, a hub, a plurality of blades journaled in said hub for pitch adjustment, a rotatable shaft connected with said hub so as to be driven thereby when said propeller is positioned in an air stream, a member attached to each blade, a centrifugally responsive flyweight supported for rotation by each member, a lost motion connection between each flyweight and its respective supporting member, means carried by each flyweight and engageable with the shaft for establishing a low pitch stop for said blades, and resilient means operatively connected with said flyweights for opposing movement thereof in response to centrifugal force.

7. An air driven propeller including in combination, a hub, a plurality of blades journaled in said hub for pitch adjustment and operable to impart rotation thereto when positioned in an air stream, a cup-shaped member operatively connected to each blade, each cup-shaped member having an annular groove, a torsion spring disposed within the groove of each cup-shaped member, one end of each torsion spring being connected to its respective cup-shaped member, a flyweight supported for rotation by each cup-shaped member, the other end of each torsion spring being connected to its respective flyweight, means constituting a lost motion connection between said flyweights and said cup-shaped members, and resilient means operatively connected with said flyweights for opposing movement thereof in response to centrifugal force.

8. The combination set forth in claim 7 wherein the operative connection between said resilient means and said flyweights comprises a pair of links for synchronizing movement of said blades.

9. The combination set forth in claim 7 wherein said flyweights have substantially equal masses disposed on opposite sides of the longitudinal blade axes.

References Cited in the file of this patent

UNITED STATES PATENTS

| | | |
|---|---|---|
| 1,287,116 | Schramm | Dec. 10, 1918 |
| 1,401,651 | Scharnagel | Dec. 27, 1921 |
| 1,443,664 | Vischer | Jan. 30, 1923 |
| 1,636,434 | Pinaud | July 19, 1927 |
| 1,768,784 | Pinaud | July 1, 1930 |
| 2,215,413 | Weeks | Sept. 17, 1940 |
| 2,550,229 | Cotton | Apr. 24, 1951 |